Patented Dec. 23, 1969

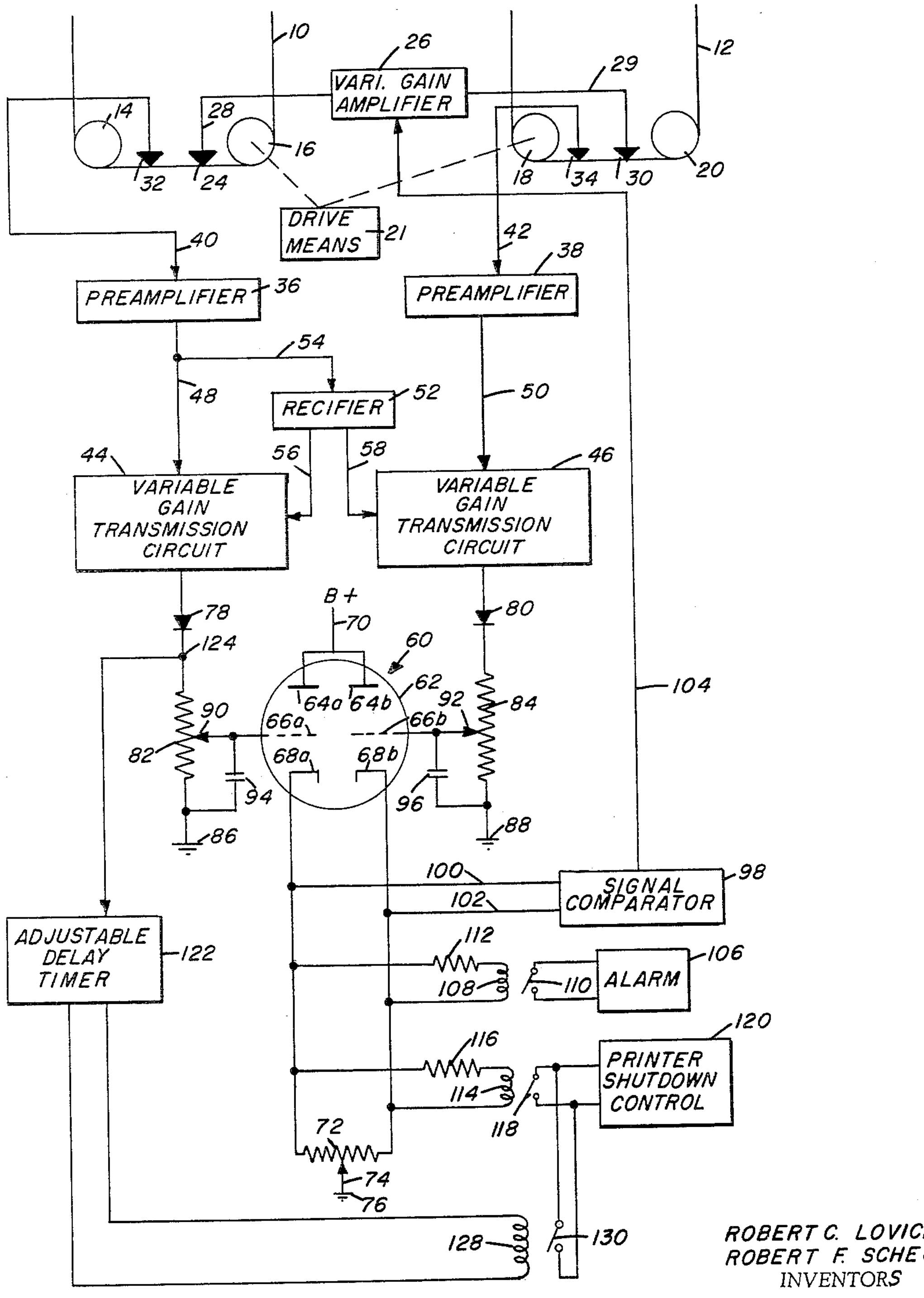
ROBERT C. LOVICK
ROBERT F. SCHEG
INVENTORS
BY [signature]
[signature]
ATTORNEYS United States Patent Office 3,485,961

3,485,961

CONTROL SYSTEM FOR RE-RECORDERS WHICH SENSES AND COMPARES ORIGINAL AND COPY RECORDS

Robert C. Lovick and Robert F. Scheg, Rochester, N.Y., assignors to Eastman Kodak Company, Rochester, N.Y., a corporation of New Jersey Filed Sept. 30, 1966, Ser. No. 583,218

Int. Cl. G11b *5/00*

U.S. Cl. 179—100.2 7 Claims

ABSTRACT OF THE DISCLOSURE

A re-recording apparatus for recording information from a master record onto a copy record, wherein the re-recorded information is sensed and compared with the information on the master record to produce an error signal for controlling the re-recording signal. Variable gain means are used at the input of the comparing means in order to maintain the accuracy of the comparing means at low signal levels.

This invention relates to printing, re-recording apparatus and the like, and more particularly to a control circuit for controlling operation of such apparatus.

The present invention is particularly directed to a control circuit for monitoring the re-recording of information having a variable characteristic so that the variable characteristic of the information will be substantially duplicated on a copy record medium. One particular application of the invention is for controlling the volume level of a sound record or track during the printing or reproduction of a sound tape on motion picture sound film.

In the reproduction or re-recording of sound records, it is necessary to maintain accurate control over the amplitude of the recording signal to produce a recording which is substantially identical to the original in volume characteristics. It is also necessary to stop the re-recording process when a true malfunction occurs to avoid waste of the recording medium. Systems used in the past to control a re-recording process have not been entirely satisfactory in that they do not accurately monitor the process during low signal conditions and do not accurately detect system malfunctions.

It is an object of the present invention to provide a control system capable of precisely controlling a re-recording operation.

Another object of the invention is to accurately monitor the amplitude of a recording signal during recording of a sound record.

In the disclosed embodiment of the invention, means are provided for deriving monitoring signals from a master record and a copy record during a re-recording process. A signal comparing means compares the two signals and establishes a difference signal which is utilized to control the amplitude of a recording signal. Means are provided for amplifying the signals derived from the master and copy records in accordance with the magnitude of the signal derived from the master record to provide for an accurate comparison of the master record and copy record signals during low signal conditions. Means are provided for energizing an alarm or indicating device when the difference signal exceeds a predetermined magnitude, and means are provided for effecting shut down of the recording operation when the signal difference indicates a malfunction in the system. Means are further provided for effecting shut down of the recording operation when the signal derived from the master record is less than a predetermined value for a predetermined time.

Other objects and advantages will become apparent from the following description taken in connection with the accompanying drawing which is a schematic illustration of a control circuit in accordance with the invention. The drawing for the most part is a functional block diagram of a control system wherein circuit connectors are functionally depicted by single electric connectors. The specific construction and circuit connection of the components thus illustrated are within the capabilities of those skilled in the art, and a more detailed disclosure is deemed to be unnecessary.

Referring to the drawing, there is shown a recorder printer for transferring a magnetic sound record or track from a master record medium compising a film or tape 10 to a copy record medium comprising a film or tape 12. As indicated diagrammatically, the films 10 and 12 are directed around suitable rollers 14, 16, 18 and 20 and are driven in synchronism by a suitable driving means 21 in a manner well known to those skilled in the art. The film supporting and transporting means form no part of the present invention and further description is believed to be unnecessary.

The sound record on the film 10 is detected by a pick-up head 24 which is coupled to the input of a variable gain amplifier 26 as schematically illustrated on the drawing by conductor 28. The output of amplifier 26 is coupled to a recording head 30 as schematically indicated by a conductor 29. The amplifier 26 is effective to amplify the electrical output signal of head 24 and establish a signal input to head 30 to thereby produce a magnetic record on film 12 corresponding to the record on film 10. As will later be described in more detail the gain of the amplifier 26 is varied in accordance with a signal derived in a comparison circuit to insure substantially identical reproduction of the master record on film 10.

A pair of monitoring pick-up heads 32 and 34 are associated with the films 10 and 12 respectively to establish electrical signals derived from the master record and the reproduced record respectively. The heads 32 and 34 are positioned in equal time spaced relationship with the heads 24 and 30, respectively, whereby the sound records of the two films are detected under substantially identical conditions.

The heads 24, 30, 32 and 34 may be of the magnetic type well known to those skilled in the art or may take other forms, depending on the type of record being reproduced. For example, in the case of an optical sound track master suitable photoelectric pick-up devices could be used to derive recording and monitoring signals in accordance with the inventive concept herein disclosed.

Referring now to the control circuit, the monitoring signals established by the monitoring heads 32 and 34 are applied to the input of a pair of preamplifier circuits 36 and 38 as schematically indicated by conductors 40 and 42. The outputs of the preamplifier circuits are coupled to the inputs of a pair of variable gain transmission circuits 44 and 46 by conductors 48 and 50 respectively.

In accordance with one feature of the invention, the gain of the transmission circuits 44 and 46 is adjusted in accordance with the amplitude of the monitoring signal derived from the master record so that the outputs of the transmission circuits 44 and 46 will be of usable magnitude in the comparision circuit hereinafter described over the entire amplitude range of the sound record recorded on film 10. More specifically, the output of preamplifier 36 is connected to a rectifier 52 as indicated schematically by conductor 54. The output of rectifier 52 is coupled to the transmission circuits 44 and 46 as schematically indicated by conductors 56 and 58 respectively to control the gain of the transmission circuits 44 and 46. In operation, when the output of the preamplifier 36 decreases due to a decrease in amplitude of the sound track on film 10 the gain of the transmission circuits 44 and 46 will be proportionally increased to maintain the outputs of transmission circuits 44 and 46 at a usable level in the comparison circuit described below.

The outputs of the transmission circuits 44 and 46 are compared in a comparison circuit identified generally by the reference numeral 60 to establish a control signal which is utilized to vary the gain of amplifier 26 and thereby vary the amplitude of the recording signal applied to head 30. In the disclosed embodiment the comparison circuit 60 includes a differential amplifier comprising a double triode vacuum tube 62 having a pair of triode sections defining anodes 64*a* and 64*b*, grids 66*a* and 66*b* and cathodes 68*a* and 68*b*, the suffix letters *a* and *b* identifying the separate triode sections. As will be apparent to those skilled in the art, however, voltage comparing devices other than a differential amplifier can be used in the system disclosed and the specific disclosure of a differential amplifier is made only for the purpose of disclosing one specific embodiment of the invention.

The anodes 64*a* and 64*b* are coupled to a B+ power supply as indicated by conductor 70. The cathodes 68*a* and 68*b* are connected to the opposite ends respectively of a resistance 72 having a slider or movable contact 74 connected to ground at 76. As will be apparent to those skilled in the art, the position of contact 74 determines the cathode resistance of the two triode sections and may be adjusted to divide the resistance 72 between the two sections to calibrate the circuit.

The outputs of transmission circuits 44 and 46 are connected through diode rectifiers 78 and 80 and resistances 82 and 84 to ground at 86 and 88 respectively. The resistances 82 and 84 are provided with adjustable contacts 90 and 92 which are electrically connected to grids 66*a* and 66*b* to establish input potentials on the grids 66*a* and 66*b*, corresponding to the voltage drops between the upper end of resistances 82 and 84 and contacts 90 and 92 respectively. A pair of capacitors 94 and 96 are connected between the contact arms 80 and 82 and the lower ends of resistances 72 and 74 respectively. The capacitors 94 and 96 and associated grid resistances 82 and 84 define R-C circuits having time constants such as to prevent sudden changes in the grid voltages in response to sudden variations in the potential of contact arms 90 and 92.

A signal detection circuit 98 coupled to the cathodes 68*a* and 68*b* as schematically indicated by conductors 100 and 102, is effective to continuously detect any difference in the cathode potentials of the two triode sections and establish an output signal representative of the potential difference. The output of circuit 98 is coupled to the gain control circuit of variable gain amplifier 26 as schematically indicated by conductor 104 to introduce a variation in gain corresponding to the potential differential of cathodes 68*a* and 68*b*.

The circuitry thus far described is preferably calibrated by means of contacts 90 and 92, and balanced by contact 74, so that when the outputs of monitoring heads 32 and 34 are equal, the potentials at the cathodes 68*a* and 68*b* will be equal and the potential difference measured by circuit 98 will be zero. The output of comparison circuit 98 will accordingly be zero and the gain of amplifier 26 will remain constant. At this null condition the magnetic record being re-recorded on film 12 will substantially correspond to the record on the film 10.

If the outputs of the monitoring heads 32 and 34 should become unequal indicating a difference in amplitude of the two records being compared a potential difference will appear between the cathodes 68*a* and 68*b* and be detected by circuit 98 which varies the gain of amplifier 26 in a direction to vary the amplitude of the input signal to recording head 30 in a direction to restore the zero differential condition.

The system disclosed thus continuously compares the master record and the copy record and adjusts the amplitude of the recording signal to maintain a null balance condition between the monitoring signals derived from the master record and the copy record. The R-C circuits defined by the capacitors 94 and 96 and resistors 82 and 84 respectively serve to introduce stability into the system by preventing response of comparison circuit 60 to momentary signal fluctuations caused by momentary errors in synchronism of the film speeds, etc. The variable gain feature of the transmission circuits 44 and 46 insures an accurate comparison of the monitoring signals derived from the sound tracks on films 10 and 12 by maintaining the input potentials to the comparison circuit at a usable level over the entire amplitude range of the sound record.

In the case of above average variations in the volume level of the recorded record relative to the master record, it is desired to warn the operator that the process requires observation for possible malfunction. To this end, the disclosed embodiment of the invention includes an alarm device 106 which may comprise an indicator, light, bell, etc., of a form known in the art. Energization of the alarm device 106 is controlled by an electric relay comprising a winding 108 arranged to close a normally open switch 110 in response to energization of the relay winding. The relay winding 108 is connected in series with a resistance 112 across the cathodes 68*a* and 68*b* so that when the voltage differential exceeds a predetermined positive or negative value the relay will be energized to close switch 110 and energize the alarm device 106 to thereby warn the operator that the recording process requires observation.

Means are also provided for terminating the recording process in the event the voltage differential across the cathodes 68*a* and 68*b* becomes large enough to indicate an obvious malfunction in the system. This means comprises a relay having a winding 114 connected in series with a resistance 116 across the cathodes 68*a* and 68*b* and having a normally open switch 118 arranged to control energization of a printer shut-down control 120. When the voltage differential across cathodes 68*a* and 68*b* exceeds a predetermined value indicating an obvious malfunction, relay switch 118 will close to energize the shut down control 120 and terminate the recording operation.

Means are also provided for terminating the recording process in the absence of an output signal from monitoring head 32 of recording magnitude. Such a condition can occur due to a malfunction in the monitoring head 32, preamplifier 36 or transmission circuit 44 or as a result of a defect in the master record. This means comprises an adjustable delay timing circuit 122 the input of which is coupled to the junction 124 of rectifier 78 and resistance 82 as schematically indicated by conductor 126 and the output of which is coupled to a relay winding 128 having a normally open switch 130 connected in parallel with relay switch 118 to control energization of the shut-down control system 120. When the potential at junction 124 is below a predetermined magnitude for a predetermined time the time delay circuit 122 will function to energize relay 128 and thereby close switch 130 to cause the shut-down control system to terminate the recording operation.

When the output signal of preamplifier circuit 36 is so low as to be below the normal amplitude range of the sound record on film 10 the variable gain control associated with the transmission circuit 44 will be incapable of maintaining a useful signal output from circuit 44. The potential at terminal 124 will accordingly decrease to the response level of timer 122 whereupon the recording system will be shut down in the manner described. It will be apparent that suitable voltage sensing solid state circuitry could be used in place of the relays described above to control operation of the alarm device 106 and printer shut-down control 120.

While only one embodiment of the invention has been herein shown and described it will be apparent to those skilled in the art that many changes may be made in the structure and arrangement of parts disclosed without departing from the scope of the invention.

It is claimed and desired to secure by Letters Patent of the United States:

1. In a control system for re-recording apparatus wherein a master record medium is driven in synchronism with a copy record medium, the combination comprising:

means for re-recording on the copy record medium information recorded on the master record medium;

means for deriving an electrical signal representative of the magnitude of a variable characteristic of the information recorded on the master record medium;

means for deriving an electrical signal representative of the magnitude of the same characteristic of the information re-recorded on the copy record medium;

a pair of variable gain circuits coupled to said signal deriving means respectively;

means for increasing the gain of said variable gain circuits in response to a decrease in the magnitude of said signal derived from the master record medium to maintain the magnitudes of said signals at a relatively constant level over the range of variation of said characteristic;

a differential amplifier circuit coupled to said variable gain circuits for establishing output potentials corresponding to said signals respectively; and means coupled to said differential amplifier circuit responsive to a difference in said output potentials to vary the magnitude of the characteristic in regard to information being re-recorded on the copy record medium.

2. In a control system for re-recording apparatus as claimed in claim 1 further including alarm means operative in response to a first predetermined difference in said potentials.

3. In a control system for re-recording apparatus as claimed in claim 2 further including means for terminating operation of the re-recording apparatus in response to a second predetermined difference in said potentials.

4. In a control system as claimed in claim 1 wherein said differential amplifier circuit comprises:

a double triode vacuum tube defining a pair of triode sections each comprising an anode, a grid and a cathode;

circuit means connecting said anodes to a positive voltage supply;

a pair of input circuits coupling said grids to said variable gain circuits respectively; and circuit means coupling said cathodes to a negative voltage supply;

said output potentials being the potentials of said cathodes.

5. In a control system for re-recording apparatus wherein a master record medium having a magnetic record of varying amplitude recorded thereon is driven in synchronism with a copy record medium, the combination comprising:

pick-up means for deriving a recording signal from the master record medium;

recording means for recording a signal of varying amplitude on the copy record medium;

circuit means coupled to said pick-up means and to said recording means including a variable gain amplifier for amplifying said recording signal and applying the same to said recording means to reproduce the magnetic record on the master record medium on the copy record medium;

a pair of monitoring pick-up means for deriving monitoring signals representative of the respective amplitudes of the record on the master record medium and the record reproduced on the copy record medium, respectively;

means responsive to a difference between said monitoring signals for varying the gain of said amplifier and the amplitude of the record reproduced on the copy record medium, said gain varying means comprising a circuit responsive to said monitoring signals for establishing electrical potentials corresponding to said signals respectively; and means responsive to a difference between said potentials for varying the gain of said amplifier; and time delay means responsive to the signal derived by the monitoring means associated with the master record medium for terminating operation of the re-recording apparatus when the magnitude of said signal is less than a predetermined value for a predetermined length of time.

6. In a control system for re-recording apparatus wherein a master record medium is driven in synchronism with a copy record medium, the combination comprising:

first means for re-recording on the copy record medium information recorded on the master record medium;

second means independent of said first means for deriving an electrical signal representative of the magnitude of a variable characteristic of the information recorded on the master record medium;

means for deriving an electrical signal representative of the magnitude of the same characteristic of the information re-recorded on the copy record medium;

means for comparing said signals to derive a control signal representative of the relative magnitudes of said signals;

means responsive to said control signal for varying the magnitude of said characteristic of the information re-recorded on said copy record medium; and time delay means responsive to the signal derived by said second means for terminating operation of the re-recording apparatus when the magnitude of said signal is less than a predetermined value for a predetermined length of time.

7. In a control system for re-recording apparatus wherein a master record medium is driven in synchronism with a copy record medium, the combination comprising:

first means for re-recording on the copy record medium information recorded on the master record medium;

second means independent of said first means for deriving an electrical signal representative of the magnitude of a variable characteristic of the information recorded on the master record medium;

means for deriving an electrical signal representative of the magnitude of the same characteristic of the information re-recorded on the copy record medium;

a pair of variable gain circuits coupled to said signal deriving means, respectively;

means for increasing the gain of said variable gain circuits in response to a decrease in the magnitude of said signal derived from the master record medium to maintain the magnitudes of said signals at a relatively constant level over the range of variation of said characteristic;

means for comparing said signals to derive a control signal representative of the relative magnitudes of said signals; and means responsive to said control signal for varying the magnitude of said characteristic of the information re-recorded on said copy record medium.

References Cited

UNITED STATES PATENTS

| | | | |
|---|---|---|---|
| 2,774,056 | 12/1956 | Stafford et al. | 179—100.2 |
| 3,011,160 | 11/1961 | Gratian | 179—100.2 |
| 3,217,111 | 11/1965 | Namenyi-Katz | 179—100.2 |

BERNARD KONICK, Primary Examiner

J. R. GOUDEAU, Assistant Examiner